UNITED STATES PATENT OFFICE.

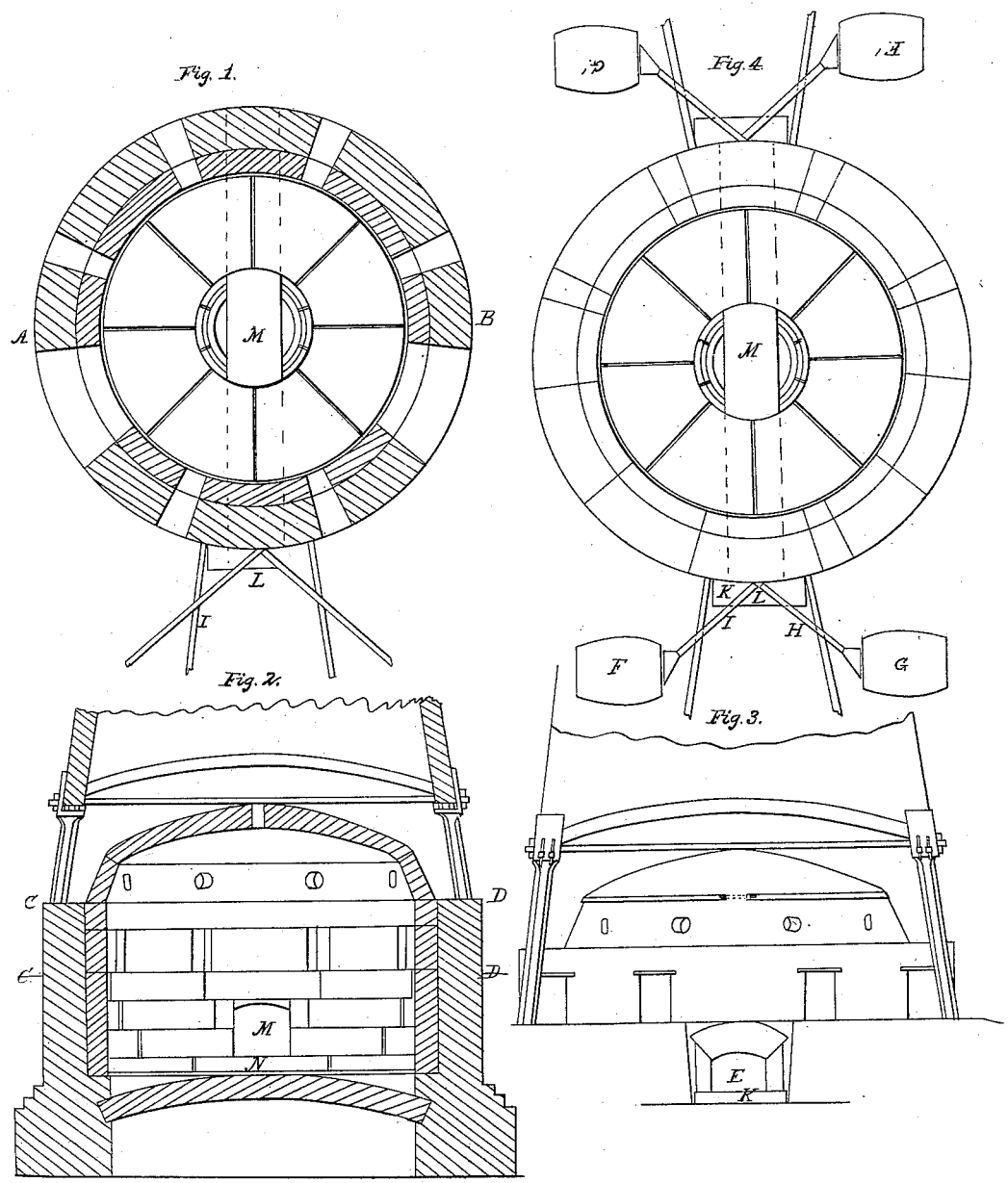

W. HARTELL AND J. LANCASTER, OF PHILADELPHIA, PENNSYLVANIA.

MODE OF GENERATING HEAT.

Specification forming part of Letters Patent No. 9,419, dated November 23, 1852; Reissued November 2, 1858, No. 616.

*To all whom it may concern:*

Be it known that we, WILLIAM HARTELL, of the district of Kensington, in the county of Philadelphia and State of Pennsylvania, and JOSEPH LANCASTER, of the district of Spring Garden, in the county and State aforesaid, have invented a new and useful Mode of Generating Heat in Furnaces Used for the Melting or Manufacturing of Glass; and we do hereby declare that the following is a full and exact description.

The nature of our invention consists in the adaptation of or the rendering available, tar as a fuel for the production of the intense and steady heat required for the melting or manufacture of glass, by introducing it into the furnace in combination with water or the vapor of water.

To enable any person skilled in the art to make or use our invention, we will proceed to describe its construction and operation. And first, we will describe the apparatus which has been actually used by us.

Upon each side of the sheer-hole or opening for the introduction of fuel, (E, Fig. 3) and in any convenient position so as not to interfere with the operations of the workmen, we place a receptacle or reservoir (F and G, Fig. 4), one containing the tar, and the other the water. The bottom of each receptacle or reservoir is at any height above the point at which we introduce the tar and water into the furnace which will allow the fluid to flow along the pipes, tubes or troughs hereinafter mentioned, by the force of gravity. At or near the bottom of each receptacle or reservoir a pipe, tube or trough (H and I, Figs. 1 and 4) is inserted, having at or near its insertion a gate, stop cock or any other of the well-known means for stopping or regulating the flow of fluid or semi-fluid substances. The end of each of these pipes, tubes or troughs we introduce into the furnace through the sheer-hole on to the bed (K, Figs. 1, 3, and 4); bringing or placing the ends of the pipes, tubes or troughs in contact or close proximity (as at L, Figs. 1 and 4), so that the tar and water flow upon the bed together or in combination and thence on to the tone-stone (N, Fig. 2). A fire having been kindled or the furnace sheered up, in any of the usual ways, the tar and water are allowed to flow at the same time along the respective pipes, tubes or troughs, and coming in contact with the fire or with the heated surface of the bed or of the tone-stone, the tar is ignited, and combustion, owing to the presence of the water, goes on with a rapidity sufficient to produce the intense and steady heat required for the melting or manufacture of glass. We say "coming in contact with the fire or with the heated surface of the bed or of the tone stone", because in our furnace we melt and work up the entire contents of all the pots in twenty-four hours, and then commence a fresh melt, melting during the night for twelve hours and blowing during the day, and sometimes we use wood as a fuel during the working hours to maintain the blowing heat, in which case we rake out all the ashes and coals from the tone of the furnace previous to commencing a fresh melt, the heat remaining in the bed and tone-stone being sufficient to ignite the tar when it is allowed to flow in as above. We have used tar and water as above described, during the working hours as well as during the melt, but as the saving in the amount of fuel is not so great during the working hours, owing to a much less degree of heat being required, and as it requires constant watching and very great care to keep the tar in combustion, at so comparatively low a degree of heat, without the evolving of smoke, which will render the glass unfit to be worked; we have found it more convenient to use wood during the working hours. The respective proportions of tar and water to be used it is impossible to state with accuracy as they will depend upon circumstances which are continually changing, as, the state of the atmosphere—the direction of the wind, reference being had to the situation of the furnace, the position of the sheer hole, &c.,—and upon others. But it may be stated generally that when the tar and water are first introduced into the furnace after it is sheered up, or after the blowing is over (where, as above, wood is used during the working hours), the tar being introduced gradually so as not to choke or extinguish the fire, say in a stream or flow of about the thickness of an ordinary quill, the water should be allowed to flow at the same time in a stream of about the same size—rather, less, if anything. And the flow of tar being gradually increased as the combustion progresses, by increasing the flow of water, the combustion of the tar is increased in rapidity, and by diminishing the flow of water the combustion goes on more slowly, and the intensity of the heat is thus regulated and controlled. The proportion of water admitted must of course never be so great as to extinguish the flame and thus defeat the very end designed to be attained by its use. It will seldom be found necessary to increase the size of the stream of tar beyond about one-half a square inch in section.

We have thus described one mode, in which we have generally used our invention, but it may be modified in a variety of ways which do not at all alter its nature or character. Instead of placing a receptacle or reservoir for tar on one side of the sheer-hole, and another for water on the other, we have sometimes advantageously employed a reservoir or receptacle for tar on each side of the sheer-hole and a receptacle or reservoir for water placed above them both bringing or placing the ends of the pipes, tubes or troughs from both tar-reservoirs and of that from the water-reservoir in contact or close proximity upon the bed. Or, where but one receptacle or reservoir of tar is used, we have placed the water-reservoir above it, bringing or placing the ends of the pipes, tubes or troughs as above stated. Where there are two sheer-holes, one on each side of the furnace, as is the case in that used by us, we have placed a tar-reservoir or tar-reservoirs and the corresponding water-reservoir at each sheer-hole in either of the positions above referred to (see Fig. 4). Also, instead of bringing or placing the ends of the pipes, tubes or troughs in contact or close proximity upon the bed as above stated, in connection with either of the above positions of the respective receptacles or reservoirs we have brought or placed said ends into a third pipe, tube or trough, through which the tar and water together flow on to the bed.

We do not know that there is any peculiar advantage in one of the above mentioned ways of using our invention over any other of them, but they have all been used by us beneficially. But we wish to state distinctly that we do not limit ourselves to the precise methods of applying or using our invention specially set forth above. The position of the receptacles or reservoirs may be anywhere outside of the furnace; but the position near the sheer-hole (or near the aperture where the tar and water are introduced into the furnace, if any other than the sheer-hole should be used as hereinafter mentioned) is the most advantageous, as requiring a less length of pipes, tubes or of troughs to conduct the tar and water. The receptacles or reservoirs for containing the tar and water may be of any convenient shape and of any convenient material. A receptacle or reservoir may be used divided by a partition or partitions, in one or more of the divisions formed by which the tar may be placed, and in the remaining division or divisions the water. We have found common hogsheads or oil casks answer the purpose of receptacles or reservoirs well, being cheap and readily adapted to use by inserting a tap, &c. or the end of the pipe tube or trough into or near the bottom. The pipes, tubes or troughs may be of any suitable material but that part of them which enters the furnace must be of a material which will not be destroyed by the heat. Instead of a pipe, tube or trough being inserted into the receptacle or reservoir, a tap or faucet may be inserted therein, whence the flow of the tar or water into the pipe, tube or trough may be stopped or regulated. The position of the gate, or stop cock in the pipe, tube or trough is immaterial. The tar and water are introduced by us on to the bed through the sheer-hole, as being the most convenient way, and saving the necessity of making other apertures in the furnace; but the pipes, tubes or troughs may be introduced under the benches, sieges or seats, or through one sheer-hole, or through both where two are used, or through any or all of these ways together; though it will be found sufficient to use the sheer-holes alone, whether there be two or only one, for the introduction of the pipes, tubes or troughs into the furnace, without making other apertures expressly for that purpose. The object to be attained, is the bringing the tar and water, at the same time, in contact or in close proximity, or in combination or mixture, upon the bed, or tone-stone, or into the tone of the furnace, where the tar is ignited, and owing to the presence of the water it is adapted or rendered available as a fuel capable of producing the intense and steady heat required. The same end may be attained by the use of steam, or water and steam, in place of water alone; but the water is the cheapest and most readily used. The steam may be generated in any of the usual ways and introduced into the furnace through a pipe or tube having its end in contact or in close proximity with that of the tar pipe, tube or trough upon the bed; or else introduced directly into the tar-pipe or tube, and passing with the tar into the furnace. Wood-tar may be used, but we have found coal-tar or gas-tar answer the purpose better. The tar and water may be used as above described, either alone, or with any of the usual fuels; but they are used more advantageously alone. They cannot be used upon a grate, as being fluid, they would escape between the grate-bars.

We do not claim the use of tar as a fuel as that is well known and practised in the manufacture of gas; but What we do claim as our invention and desire to secure by Letters Patent, is—

The adaptation of, or rendering available, tar as a fuel, for the production of the intense and steady heat required for the melting and manufacturing of glass, by introducing water or the vapor of water into the furnace, in contact, or in close proximity, or in combination or mixture with the tar, substantially in the manner set forth above.

The letters and figures in the above specification refer to the accompanying drawings, in which—

Figure 1, is a horizontal section of the glass furnace, at the level of the benches; Fig. 2, a perpendicular section through the center of the furnace at right angles with the direction of the tone; Fig. 3, an elevation; and Fig. 4, a horizontal section at the level of the benches, showing also, the receptacles or reservoirs at both sheer-holes in one of the positions above described.

WILLIAM HARTELL.
JOSEPH LANCASTER.

Witnesses:
SAML. C. PERKINS,
JOHN CLOUDS.

[FIRST PRINTED 1912.]